(12) United States Patent
Tokuhashi et al.

(10) Patent No.: US 7,372,987 B2
(45) Date of Patent: May 13, 2008

(54) THREE-DIMENSIONAL IMAGE EVALUATION UNIT AND DISPLAY DEVICE USING THE UNIT

(75) Inventors: Yuki Tokuhashi, Hachioji (JP); Yoshinobu Tanaka, Hachioji (JP)

(73) Assignee: Olympus Corporation, Tokyo (JP)

(*) Notice: Subject to any disclaimer, the term of this patent is extended or adjusted under 35 U.S.C. 154(b) by 661 days.

(21) Appl. No.: 10/482,316

(22) PCT Filed: Mar. 15, 2002

(86) PCT No.: PCT/JP02/02510
§ 371 (c)(1),
(2), (4) Date: May 27, 2004

(87) PCT Pub. No.: WO03/005734
PCT Pub. Date: Jan. 16, 2003

(65) Prior Publication Data
US 2004/0208357 A1 Oct. 21, 2004

(30) Foreign Application Priority Data
Jul. 3, 2001 (JP) ............................ 2001-201748

(51) Int. Cl.
*G06K 9/00* (2006.01)
(52) U.S. Cl. .................. 382/154; 348/42; 348/E13.024
(58) Field of Classification Search ............... 382/154, 382/199, 209; 348/345, 432, 355, 348, E13.016, 348/E13.024, E13.025, E13.008, E13.02, 348/E13.023, E13.066, 347, 47, 42; 250/201.2; 396/101
See application file for complete search history.

(56) References Cited

U.S. PATENT DOCUMENTS 6,163,337 A * 12/2000 Azuma et al. ................ 348/43

6,404,484 B1 * 6/2002 Sogawa ...................... 356/3.14
6,477,260 B1 * 11/2002 Shimomura ................. 382/106
6,987,534 B1 * 1/2006 Seta ......................... 348/229.1
7,161,614 B1 * 1/2007 Yamashita et al. ............. 348/42

FOREIGN PATENT DOCUMENTS

JP  11-355808 A  12/1999

* cited by examiner

*Primary Examiner*—Sheela Chawan
(74) *Attorney, Agent, or Firm*—Frishauf, Holtz, Goodman & Chick, P.C.

(57) ABSTRACT

A three-dimensional image evaluation unit (100) for evaluating an input image. The parallax statistic is calculated by measuring the parallax included in the input image by a parallax measuring means (3), the static parallax evaluation value for the calculated parallax statistic and/or a dynamic parallax evaluation value for a temporal change in the parallax statistic is determined by a static parallax evaluating means (4-1) and/or a dynamic parallax evaluating means (4-2) of an evaluating means (4) to evaluate parallax information on the image. An abrupt change in the parallax can be evaluated thereby, and countermeasures against errors in measurement and noise of the image can be taken, so that parallax information on the image can be suitably evaluated.

10 Claims, 16 Drawing Sheets

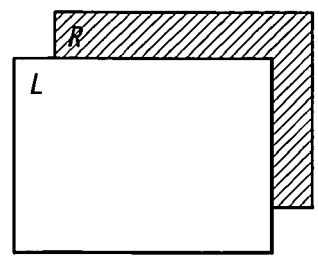
FIG. 2a
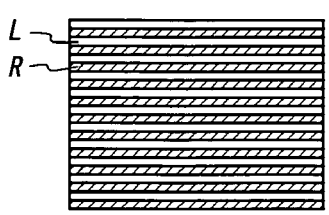
FIG. 2b
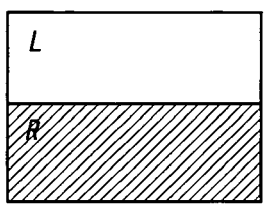
FIG. 2c
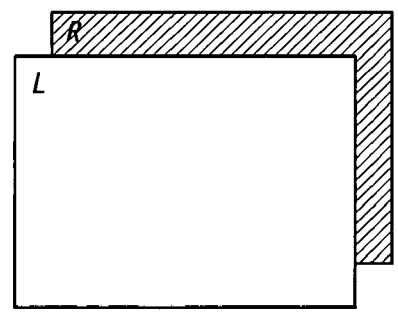
FIG. 2d
Resolution conversion
FIG. 2e
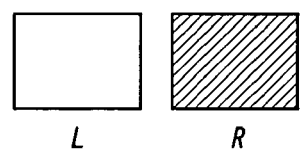

THREE-DIMENSIONAL IMAGE EVALUATION UNIT AND DISPLAY DEVICE USING THE UNIT

This application is a U.S. National Phase Application under 35 USC 371 of International Application PCT/JP02/02510 filed Mar. 15, 2002.

TECHNICAL FIELD

The present invention relates to a three-dimensional image evaluation device for evaluating the visual information included in the three-dimensional image, and a display device using the evaluation device.

BACKGROUND ART

There is said that a three-dimensional vision is tired compared with an observation of usual 2D image, since an observation state different from daily life is produced. FIGS. 16(a) and (b) are diagrams explaining the observation principle of three-dimensional image, FIG. 16(a) shows right and left screen observed as a three-dimensional image, and FIG. 16(b) shows an observation state respectively.

In FIG. 16(b), numerals 21 and 22 designate a left eye and a right eye of a viewer, respectively, numeral 23 designates a display screen where the screen for right eye and the screen for left eye are overlapped and displayed, numeral 24 designates figure A on the right screen shown in FIG. 16(a), and numeral 25 designates figure A on the left screen shown in FIG. 16(a).

As shown in FIG. 16(b), places in right and left figures A are shifted, so that in the case of paying attention to this, sight lines of viewer are intersected on this side of the screen, and thus the stereo image in figure A seems to dash out from the screen forward. Here, the angle that the sight lines crowd, is referred to as a vergence angle, and a right and left positional deviation is referred to as a parallax. On the one hand, the focus adjustment of eyes is suitable on the screen, so that the adjusting distance of the focus adjustment and the vergence distance to the point that the lines of sight from eyes intersect, are different.

Such an observation state is not generated in the daily life, so that the indistinctness and the unnaturalness might be felt. In the contents that contain a lot of rapid parallax changes to which the parallax is large, and subject dashes out from the screen particularly, it becomes harder to see while a strong stereo effect is obtained, so that it is necessary to avoid audience for a long time.

In consideration of this respect, for example, in Japanese Patent Application Opened No. 355,808/1999, there is proposed an image system that the parallax amount of the three-dimensional image signal is detected, and the operation that the degree of influence given to the viewer is assumed based on the parallax amount, and the display is switched to usual 2D image or the like, is controlled thereby avoiding the long time audience of the image with a large degree of influence to emphasize the stereo effect. Moreover, in the above patent specification, there is proposed an image system that the parallax amount is controlled so as to decrease the adjustment of eyes and the shift of the convergence, thereby avoiding the long time audience of the image with a large degree of influence.

However, in the above patent specification, a concrete method of evaluating a rapid change in parallax is not shown. Moreover, concrete measures against the error at the measuring and the noise of the image are not shown, so that it is likely not to function well according to the image.

DISCLOSURE OF INVENTION

Therefore, by paying an attention to this respect, the first object of the present invention is to provide an image evaluation device capable of evaluating a rapid change in parallax and capable of taking measures against the error at the measuring and the noise of the image. It is in providing the image evaluation device.

In addition, the second object of the present invention is to provide a display device capable of using an image evaluation device and capable of avoiding the long time audience of the image with a large degree of influence surly.

According to a first aspect of the present invention, three-dimensional image evaluation device is provided for evaluating an input image. The three-dimensional image evaluation device includes a parallax measuring means for calculating the parallax amount of statistics by measuring the parallax included in the input image, and an evaluating means for setting the evaluation value according to the calculated parallax amount of statistics, the evaluating means having static parallax evaluating means for setting evaluation value for value of parallax statistic and/or dynamic parallax evaluating means for setting evaluation value for a temporal change in parallax statistic.

According to a second aspect of the present invention, the dynamic parallax evaluating means sets a constant evaluation value when the temporal change in parallax statistic exceeds the specified value.

According to a third aspect of the present invention, the dynamic parallax evaluating means accumulates the parallax change while the parallax change is consecutive, and the dynamic parallax evaluating means sets the evaluation value according to the accumulated value, when a series of change breaks off.

According to a fourth aspect of the present invention, the dynamic parallax evaluating means accumulates the parallax change, and a constant evaluation value is set when the accumulated value exceeds the default.

According to a fifth aspect of the present invention, the parallax measuring means makes a histogram by measuring the parallax included in the input image, and calculates the parallax statistic based on the parallax value for the frequency in appearance of the histogram to exceed the threshold.

According to a sixth aspect of the present invention, the three-dimensional image evaluation device further includes an image recognition means for recognizing the kind of image displayed by an image display means, and a preprocessing means for performing a picture processing to the input image according to the recognized kind of the image, wherein the image processed by the preprocessing means is supplied to the parallax measuring means.

According to a seventh aspect of the present invention, the three-dimensional image evaluation device further includes an error code setting means for setting an error code based on the parallax measurement by the parallax measuring means, wherein an evaluating means changes the evaluation value according to the error code set by the error code setting means.

According to an eighth aspect of the present invention, the three-dimensional image evaluation device further includes a display mode recognizing means for recognizing the display mode of the image in the image display means, wherein the evaluating means sets the evaluation value according to the display mode recognized by the display mode recognizing means.

And according to a ninth aspect of the present invention, a display device includes an image display means for displaying an input image, a three-dimensional image evaluation device for evaluating the input image, and a display control means for controlling the display of the input image by the image display means based on the evaluation value in the three-dimensional image evaluation device.

BRIEF EXPLANATION OF DRAWING

FIGS. 2a-2e are diagrams explaining the operation of the preprocessing means shown in FIG. 1.

BEST MODE FOR CARRYING-OUT OF THE INVENTION

First Embodiment

Figure 1:
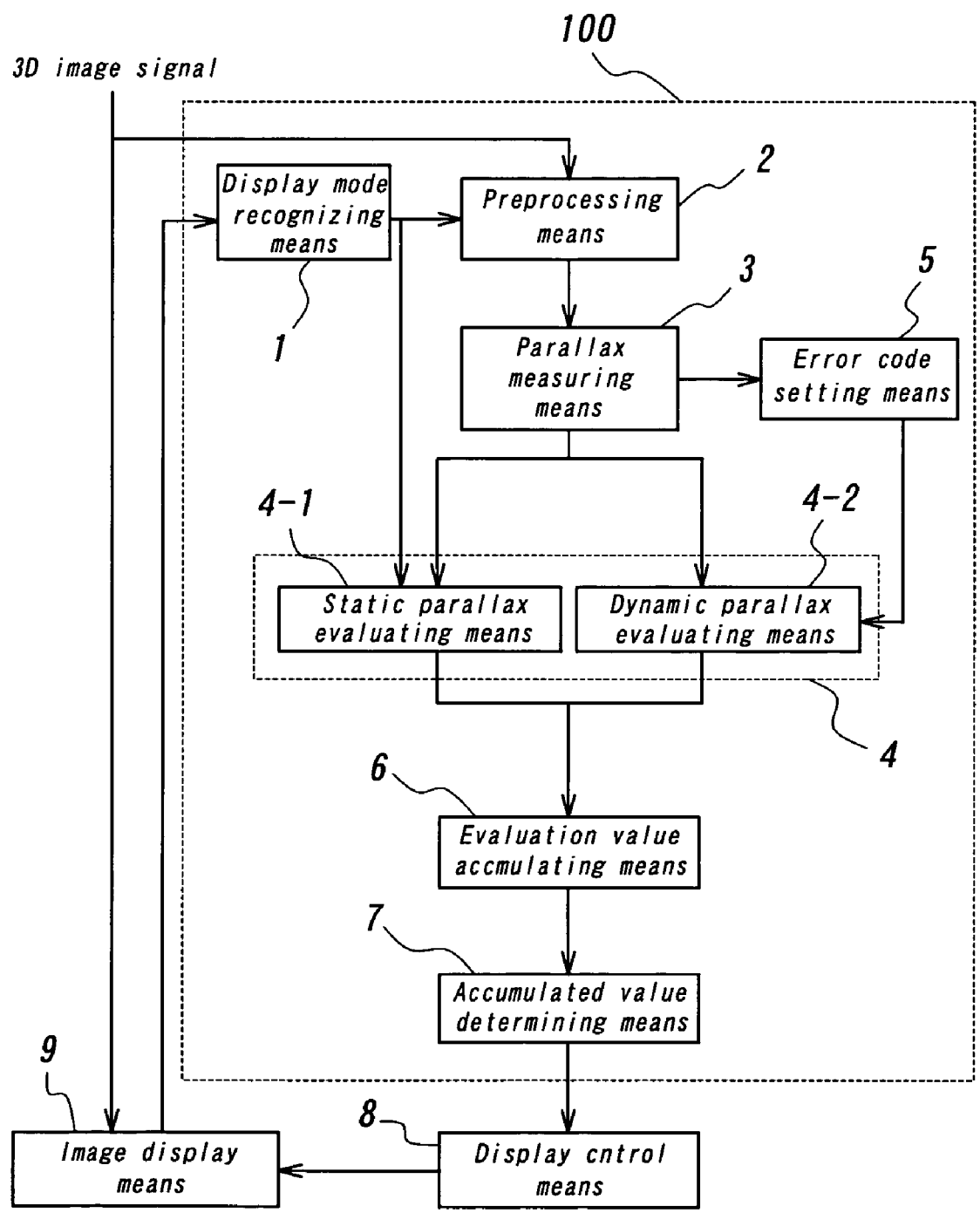
FIG. 1 is a block diagram showing the structure of the first embodiment of a display device according to the present invention.

FIG. 1 is a block diagram showing the structure of the first embodiment of a display device according to the present invention. The display device has a three-dimensional image evaluation device 100, a display control means 8, and an image display means 9, Three-dimensional image evaluation device 100 comprises a display mode recognizing means 1, a preprocessing means 2, a parallax measuring means 3, an evaluating means 4, an error code setting means 5, an evaluation value accumulating means 6, and an accumulated value determining means 7, The evaluating means 4 has a static parallax evaluating means 4-1 and a dynamic parallax evaluating means 4-2.

In FIG. 1, the three-dimensional image signal is inputted to an image display means 9 to display the three-dimensional image. Here, three-dimensional image signals are video signals for the game machine, the video device or computers, or the like, As such signals, there are signals in which right and left images are alternately transmitted every fields, and right and left images are included in one field.

The image display means 9 are formed as, for example, a Head Mounted Display (HMD), in which two display sections corresponding to the right and left eyes are included, and control in such a manner that a left image is displayed on the display section for the left eye, and a right image is displayed on the display section for the right eye, so that the user of HMD can see a stereoscopic image, and control in such a manner that only images either right and left are displayed on both right and left display sections, so that the user can see usual 2D image. Moreover, in the case that the input is not a stereo image but usual 2D image, the control is performed in such a manner that both right and left display sections are displayed as it is, so that the user can see usual 2D image.

Such a display switching is performed by following system that there are cases that a changing-over switch is installed in the image display means 9 and the user switches by hand, too, and that the display is switched by automatically detecting the kinds of the video signals, too. Moreover, the angle of view and kinds of the input video signals or the like are substituted by switching the display mode, too. These display modes and kinds of information on the displayed image are received and recognized by the display mode recognizing means 1. That is, the display mode recognizing means 1 has also a function of an image recognition means for recognizing the kinds of the image displayed by the image display means 9.

On the other hand, the three-dimensional image signal is also inputted to the preprocessing means 2, right and left images are stored in the memory of the preprocessing means 2 respectively here according to the specific timing, and preprocessing of the resolution conversion and smoothing, etc. are performed according to the information from the display mode recognizing means 1.

In parallax measuring means 3, the parallax amount included in the stereoscopic image from the preprocessed image is measured to calculate the parallax statistics. Herein, the parallax amount of statistics is to mean the statistical data such as the minimum value and the mode value etc. of the parallax amount included in the stereoscopic image.

In evaluating means 4, the parallax amount of statistics is converted into the evaluation value, based on the previously set rule. This rule is defined in consideration of person's visual characteristic. Static evaluation of parallax amount is performed by the static parallax evaluating means 4-1 of the evaluating means 4 and thus the evaluation value is set according to the value of the parallax amount of statistics. A large evaluation value is set if there is a big parallax in the image. On the one side, the dynamic evaluation of the parallax amount is performed by the dynamic parallax evaluating means, and thus the evaluation value is set according to the time change of the parallax amount of statistics.

Here, the precision of the parallax measurement is not obtained enough according to the character of input stereo image, there is a case that the reliability of the calculated parallax amount of statistics is low. Therefore, the error status is recorded by an error code setting means 5, and in case of setting the evaluation value, the evaluation value is changed if necessary referring to an error code setting means 5.

In the evaluation value accumulating means 6, evaluation values obtained by the evaluating means 4, are integrated, and adds to the previous accumulated value, whether or not the accumulated value is more than the specified value, is decided by the accumulated value determining means 7, and the display on the image display means 9 is controlled by the display control means 8 based on the decided result. For example, when the accumulated value is more than the specified value, the control is performed in such a manner that the alarm display is generated, and 3D display is switched to 2D display.

In this way, in this embodiment, the parallax of the three-dimensional image is measured, a static evaluation for evaluating the size and the sign of the parallax, a dynamic evaluation for evaluating the time change of the parallax, are performed to set the evaluation value, and those evaluation values are integrated and accumulated, so that in the images containing a lot of big parallaxes and scenes with an extreme change in the direction of depth, the accumulated value of the evaluation value becomes large rapidly, and in the image with little motion in the back and forth, and with the small parallax, it takes time to increase the accumulated value. Therefore, the control can be performed in such a manner that when the accumulated value exceeds the specified value, the switching to 2D is performed, and the alarm display is performed, and thus the stronger the visual stimulus of the three-dimensional image is, the more the audience time is short.

Next, the present embodiment is explained in detail.

FIG. 2 is a diagram explaining the operation of the preprocessing means 2.

In the three-dimensional image signal capable of being inputted to the preprocessing means 2, there are some kinds as shown in FIG. 2, and the size of the images treated is different respectively. FIG. 2(a) shows the images of each 640×480 pixels in the image size of image L for the left eye and image R for the right eye, respectively, FIGS. 2(b) and 2(c) show the image of 640×240 pixels respectively, and FIG. 2(d) shows the image of 800×600 pixels.

In the preprocessing means 2, all input images are subjected to the resolution conversion into L and R independent images of 320×240 pixels as shown in FIG. 2(e) according to the information of the display mode recognizing means 1, and are stored in the image memory. As a result, the same circuit can be used in the circuit or the like used by the image memory and the parallax measuring thereafter, regardless of the kinds of input images. In the resolution conversion, the smoothing process is performed if necessary.

Figure 3:
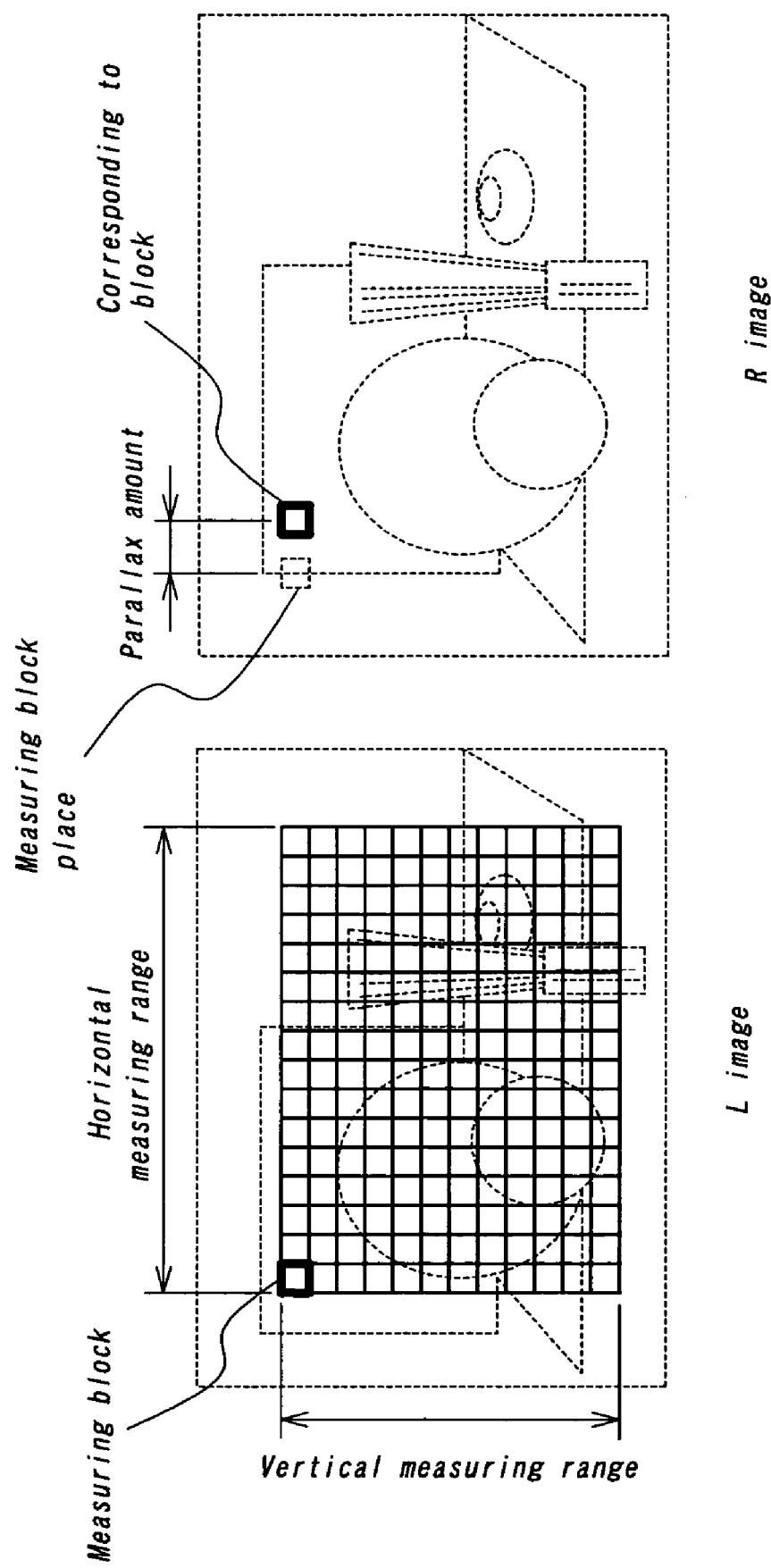
FIG. 3 is a diagram showing the principle of the parallax measuring according to the parallax measuring means shown FIG. 1.

FIG. 3 is a diagram showing the principle of the parallax measuring according to the parallax measuring means 3. The technique of a usual block matching is applied to the parallax measuring. That is, a plurality of measuring blocks are specified on L screen in order to measure the parallax of LR 2 images, and the region corresponding to the respective measuring blocks from R screen, that is, the most similar region, is searched out. The blocks fellow may overlaps mutually or may leave space mutually. In order to decide whether to resemble, for example, the sum of the absolute value of the brightness difference to respective pixels in the blocks on L image and in the block on R image (here, referred to as a sum of the differential absolute value) is taken. In this case, if the blocks in right and left images are similar, a sum of differential absolute value becomes small, so that the place where the difference absolute value sum is minimized, becomes a correspondence region. The region corresponding to the block at the upper left on L image is shown on R image by the square in FIG. 3. A difference of coordinates of a corresponding right and left blocks becomes a parallax amount.

Here, it is also possible that the measuring range need not necessarily extend to the entire screen, and possible to excludes the periphery of the image as shown in FIG. 3. The reason thereof is that in many cases, it is rare to pay attention to the periphery of the image, and the influence of the parallax in the periphery is less than the vicinity of the center of the screen. Moreover, another reason is that the corresponding region in right and left images does not often exist in the image periphery (the corresponding region overflows from the image), and thus the possibility that the measuring is meaningless, is high. As how to decide in the measuring range, besides, the information acceptance characteristic by the field place may also be considered. It is said that the effective visual field where the information acceptance is instantaneously possible only by the eye movement is within the right and left 15 degrees, upper 12 degrees and under 8 degrees, and thus in the case of HMD with large angle of view, the peripheral part becomes outside the effective visual field.

Figure 4:
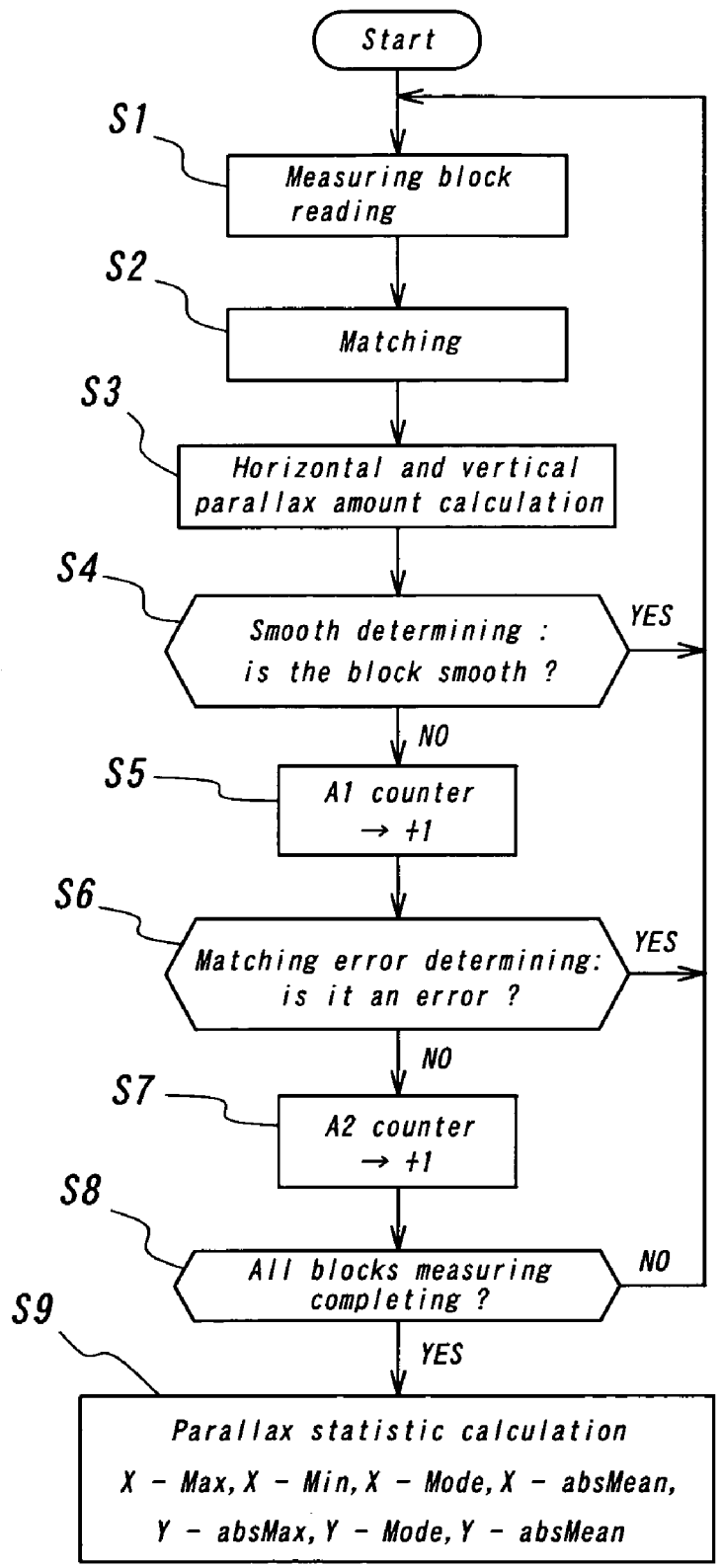
FIG. 4 is a flow chart showing the operation of the parallax measuring means shown in FIG. 1.

FIG. 4 is a flow chart showing the operation of the parallax measuring means 3. First, the measuring block is read from the image after preprocessing (step S1), the matching is performed (step S2), and the horizontal parallax amount and the vertical parallax amount are calculated from the difference of coordinates of right and left blocks (step S3).

Next, the reliability determining for the block is performed. In this reliability determining, in the case that the image in the block is a smooth (the image of the sky and the uniform wall for example corresponds to this), the possibility of failure in matching is high, and the possibility of paying attention to the block is low, so that whether or not the block is smooth is examined (step S4), if it is smooth, the data of the block is excluded and returns to the step S1, and if it is not smooth, the A1 counter for counting the number of non-smoothness blocks), is made incremented (step S5). Moreover, even when a lot of noises are present in the image, and the case that the corresponding region in right and left images, is not found by occlusion, the matching is failure, so that next, the matching error is decided (step S6), if the possibility of the matching error is high, the data of the block is excluded and returns to the step S1, and if the possibility of the matching error is low, the A2 counter for counting the number of positive matching blocks, is made incremented (step S7). Moreover, as a method of determining the matching error, it is decided whether or not the similarity used for the matching is for example larger than the specified value.

Afterwards, when the processing to all blocks is completed in step S8, the parallax statistic is calculated based on the horizontal and vertical parallax amount of the respective blocks counted by the A2 counter (step S9). Moreover, here, the negative sign is put on the parallax seen from the screen forward at the parallax amount measuring, and a positive sign is put on the parallax seen from the screen at the interior, so that a minimum value of parallax is indicated as the case seen to be the nearest, and the maximum value thereof is indicated as the case seen most far away.

Figure 5A:
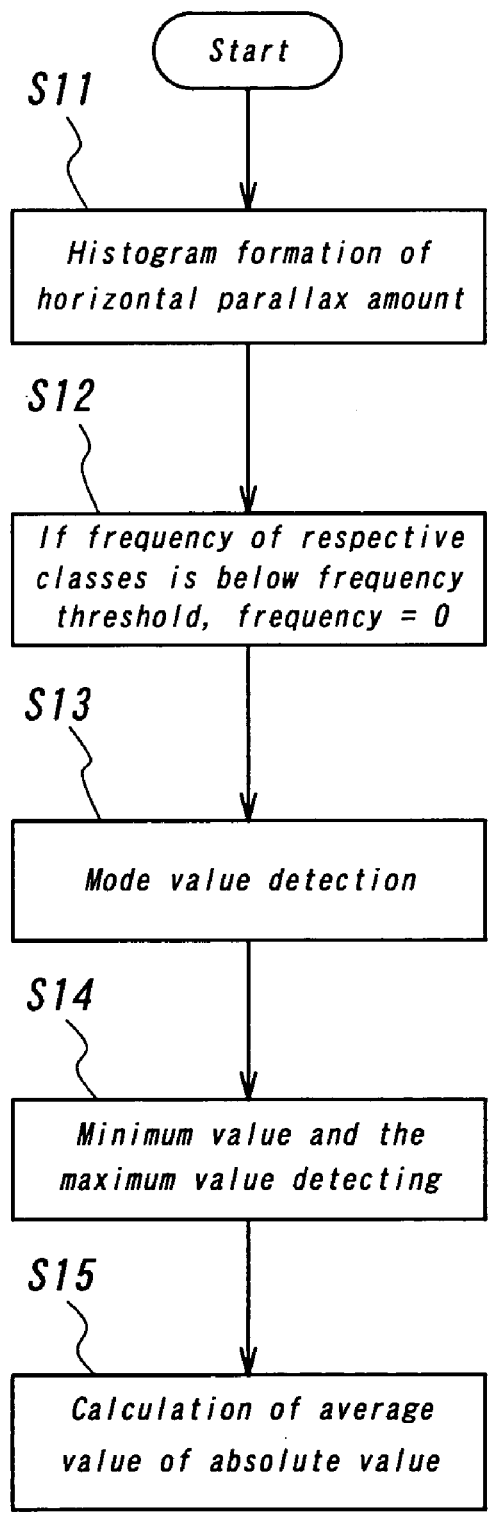
FIGS. 5a and 5b are diagrams explaining the calculating method of the parallax statistic.
Figure 5B:
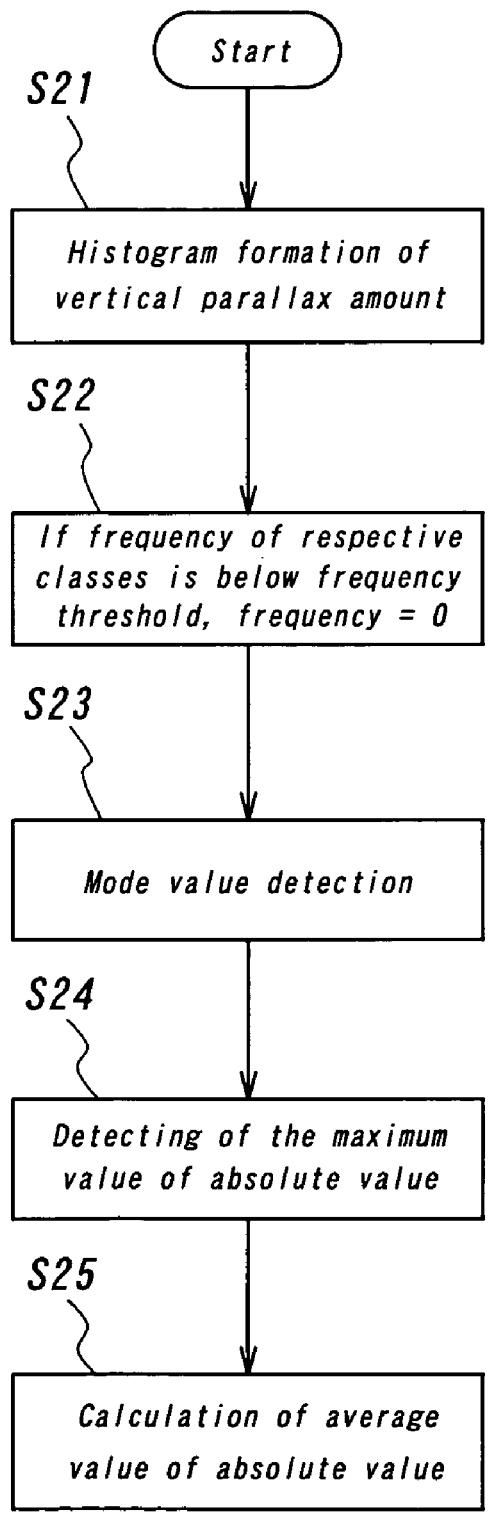

FIG. 5 is a diagram explaining the calculating method of the parallax statistic, FIG. 5(a) shows a flow chart of the case that calculates the parallax statistic relating to the horizontal parallax, and FIG. 5(b) shows a case that the parallax statistic relating to the vertical parallax is calculated. In this embodiment, a minimum value (X-Min), a maximum value (X-Max), a mode value (X-Mode), and an average value (X-absMean) of the absolute value, are required as a parallax statistic of the horizontal parallax.

Here, respective parallax statistics have the following meanings. In the stereoscopic vision, in order to put out powerful punching, the display seeming as the image dashes out forward of the screen large, is often used, but, a large parallax in such a negative direction is hard to see, and when the image is kept paying attention to for a long time, tiredness may be caused. Moreover, as to a positive direction, when the display is performed with a large parallax so as to open the sight line from the parallel the fusion becomes difficult, when the image is kept paying attention to for a long time, still, the tiredness may be caused. Then, the minimum value and the maximum value of the parallax are detected. Moreover, the possibility of matching the convergence to the region having the parallax with a high frequency of appearance by the viewer, is high, so that the mode value is also detected. When these three values can not be calculated well, an average value of the absolute value is used.

Moreover, as a parallax statistic of the vertical parallax, the mode value (Y-Mode), the maximum value of the absolute value (Y-absMax), and the average value of the absolute value (Y-absMean), are required. The meaning of the mode value is similar to the horizontal parallax. The vertical parallax uses the maximum value of the absolute value, since the sign need not be considered. Moreover, an average value of the absolute value is also obtained as with the horizontal parallax.

The histogram of the parallax amount is first made from the parallax data of respective blocks as a calculation procedure of the parallax statistic of the horizontal parallax as shown in FIG. 5(a) (step S11). Next, whether or not the frequency of respective classes of the histogram is below a predetermined frequency threshold, is searched, the frequency is adjusted to 0 if it is below the threshold (step S12). Then, the mode value, the minimum value, the maximum value, and the average value of the absolute value are calculated (step S13-S15).

Figure 6:
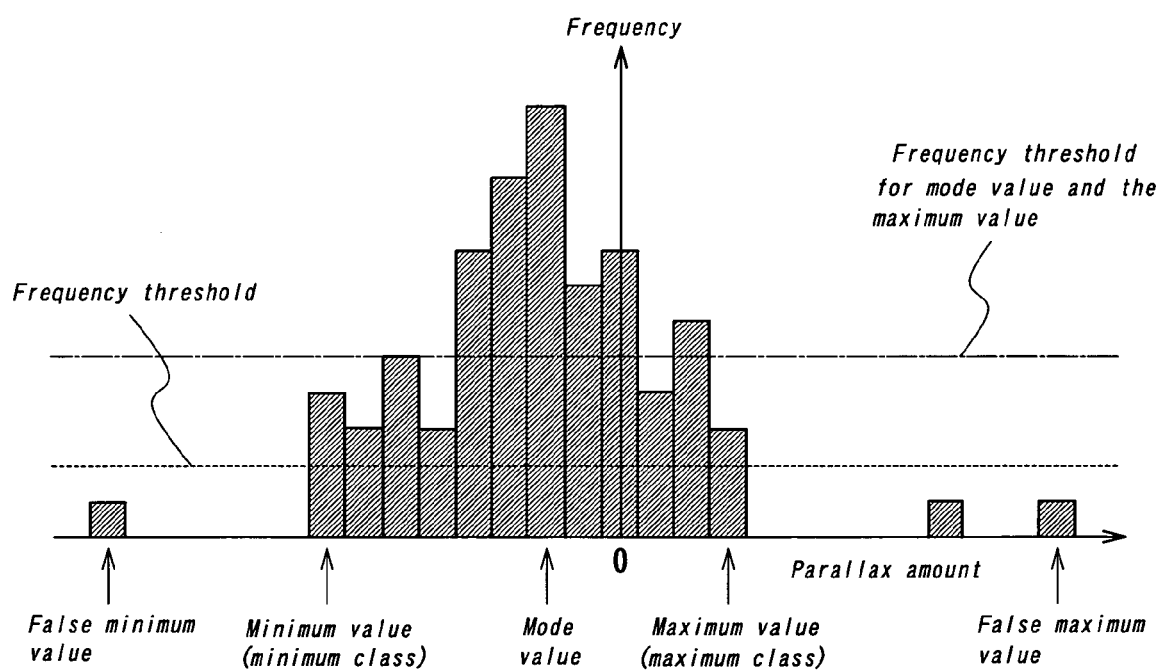
FIG. 6 is a diagram showing the histogram of the parallax amount.

Here, the reason to set the threshold of frequency is explained by using FIG. 6. FIG. 6 is a histogram of the parallax amount, and the abscissas shows the parallax amount and the ordinate shows the frequency of appearance. In this histogram, the parallax amount of zero means on display screen, and it seems that the more the image goes to the right in the abscissas, the more the image apart an interior from the screen. When the parallax amount of a general stereoscopic image is measured by a comparatively simple matching method, some matching errors occur mostly. The error data is removed by the error determining, but it is difficult to remove all error data, and even if the error data remains slightly, it influences on the detection of the maximum value and minimum value. In the graph of FIG. 6, the right end and the left end show the appearance that has been detected regardless of error data, as a false maximum value (maximum class) and a false minimum value (minimum class).

Here, when present inventors examined the behavior of the error matching, it was understood that a wrong matching part had been selected incidentally in the error by above-mentioned occlusion and the noise. That is, when the most similar region is searched for by using the sum of difference absolute value as previously stated, in the case that an original corresponding region must not exist or the similarity is low even if it exists and the sum of difference absolute value is large, if the region that the sum of difference absolute value becomes smaller than it, is present incidentally, that has been selected. Therefore, the parallax amount at the matching error takes various values, and thus it is a little that a similar value appears many times. On the contrary, the parallax amount capable of being obtained by a correct matching, has very small block size, and if there is very a lot of number of blocks, the possibility that a close value appears many times is high.

Then, the threshold is provided in the frequency of appearance as shown in the graph by the short dashes line, and the parallax amount is disregarded in the case of the frequency of appearance below the threshold, thereby ceasing the use of detecting the maximum value or the like. By this operation, the number of cases for calculating the maximum and the minimum value quite different from substance can be decreased. Moreover, only the parallax that the frequency of appearance is high on the image, can be targeted by raising the threshold. For example, as shown in FIG. 6 by a dashed line, the thresholds of the maximum value and the mode value is set higher than the threshold of the minimum value, and thus the parallax of the background does not detect if not existing at a certain degree of high frequency, the image seen to be near can be made easy to detect even if it is small, as a result, the parallax of the ball or the like dashing out to be near can be emphatically detected, rather than the background peeking at the gap in the foreground.

On the other hand, as a calculation procedure of the parallax statistic for the vertical parallax, as shown in FIG. 5(b), the histogram is first made, the same as in the case of the horizontal parallax (step S21), whether or not the frequency of respective classes of the histogram is below a predetermined frequency threshold, is searched, and the frequency is adjusted to 0 if it is below the threshold (step S22). Then, the mode value, the maximum value of the absolute value, and the average value of the absolute value are calculated (step S23-S25).

Figure 7:
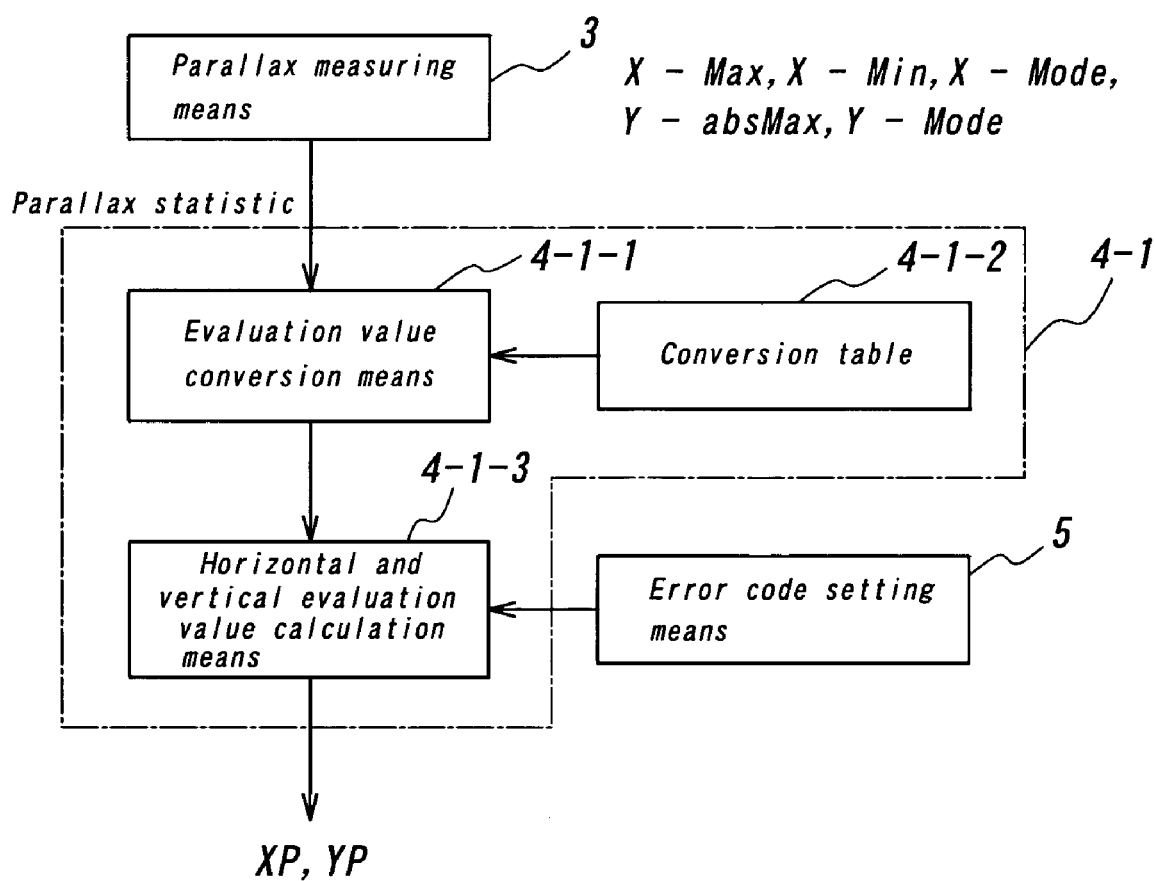
FIG. 7 is a block diagram showing the constitution of the static parallax evaluating means shown in FIG. 1.

Next, the evaluating means 4 is explained. FIG. 7 is a block diagram showing the constitution of the static parallax evaluating means 4-1. The static parallax evaluating means 4-1 comprises an evaluation value conversion means 4-1-1, a conversion table 4-1-2, and horizontal and vertical evaluation value calculation means 4-1-3, and the horizontal and vertical evaluation value calculation means 4-1-3 can refer an error code setting means 5.

In evaluation value conversion means 4-1-1, a plurality of parallax statistics obtained in the former stage horizontally and vertically respectively, are converted into the evaluation value with reference to the display mode recognizing means 1 and the conversion table 4-1-2. After respective parallax statistics are converted into the evaluation value, respective evaluation values are operated by the horizontal and vertical parallax evaluation value calculation means 4-1-3, to calculate respective ones of the horizontal and vertical evaluation value. The parallaxes for a minimum value, a maximum value, and a mode value of the horizontal parallax, and a mode value of the vertical parallax and maximum values of the absolute value, are made as P(X-Min), P(X-Max), P(X-Mode), P(Y-Mode), and P(Y-absMax), respectively, and the horizontal parallax evaluation value XP and the vertical parallax evaluation value YP are made as follows, $$XP = a \times P(X\text{-Max}) + b \times P(X\text{-Min}) + c \times P(X\text{-Mode})$$

$$YP = d \times P(Y\text{-absMax}) + e \times P(Y\text{-Mode})$$

wherein, a, b, c, d, and e are calculated by the weighted coefficient, and the evaluation value is changed according to the output of the error code setting means 5 described later.

The conversion table 4-1-2 directs the correspondence of the parallax amount and the evaluation value, and thus the tolerance of focal depth, convergence of eyes and disparity of adjustment, fusion limit, and easiness of fusion or the like are considered and decided. However, such a behavior corresponds to the difference between the vergence angle caused by the parallax and the vergence angle to the screen, but the relation between the parallax amount on the screen (the unit is the number of pixels) and the vergence angle caused by the parallax amount is different according to the angle of view and the number of pixels on the display screen, so that it is also necessary to conspirer the angle of view of image display means 9, simultaneously, in order to decide the correspondence of the parallax amount and the evaluation value, which are represented by the number of pixels. Moreover, as described above, when the parallax becomes large in a positive direction, the line of sight opens from the parallel and becomes rapidly hard to see, however the parallax amount that the line of sight becomes parallel is different depending on the viewing distance, so that it is also necessary to consider the viewing distance of the image display means 9.

From the above reasons, in the image display means 9 capable of changing the angle of view and the viewing distance large, the conversion table referred according to information on the display mode recognizing means 1, is changed, or the conversion into the evaluation value is performed after multiplying the parallax statistic by a coefficient different according to the angle of view.

Figure 8:
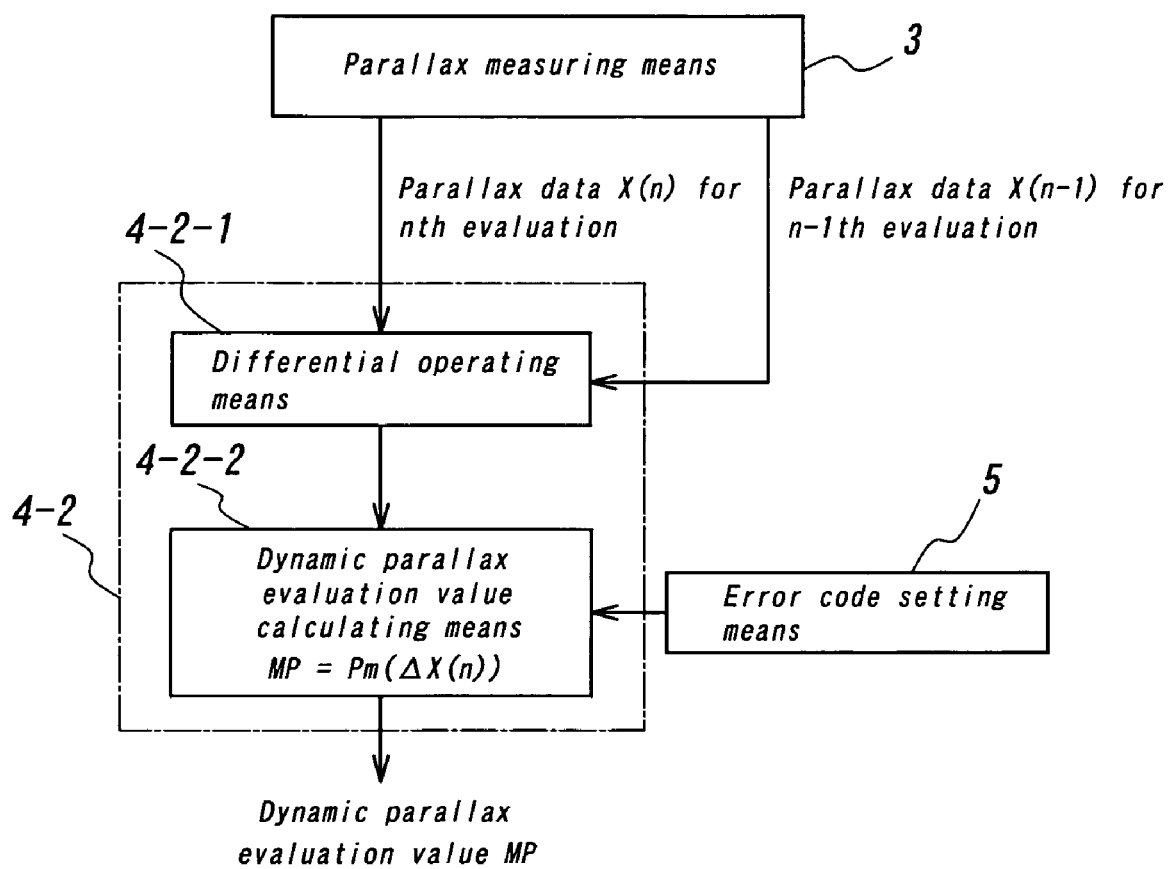
FIG. 8 is a block diagram showing the constitution of the dynamic parallax evaluating means shown in FIG. 1.

FIG. 8 is a block diagram showing the constitution of the dynamic parallax evaluating means 4-2. The dynamic parallax evaluating means 4-2 has a differential operating means 4-2-1 and a dynamic parallax evaluation value calculation means 4-2-2, and the dynamic parallax evaluation value calculation means 4-2-2 can refer an error code setting means 5.

In the differential operating means 4-2-1, a difference $\Delta X(n)$ between the n-the parallax statistic and the (n-1)-th parallax statistic measured therebefore, is calculated. In the dynamic parallax evaluation value calculation means 4-2-2, an evaluation value MP corresponding to the differential parallax data is set, in addition, the evaluation value is changed according to the output of the error code setting means 5 described later.

Figure 9:
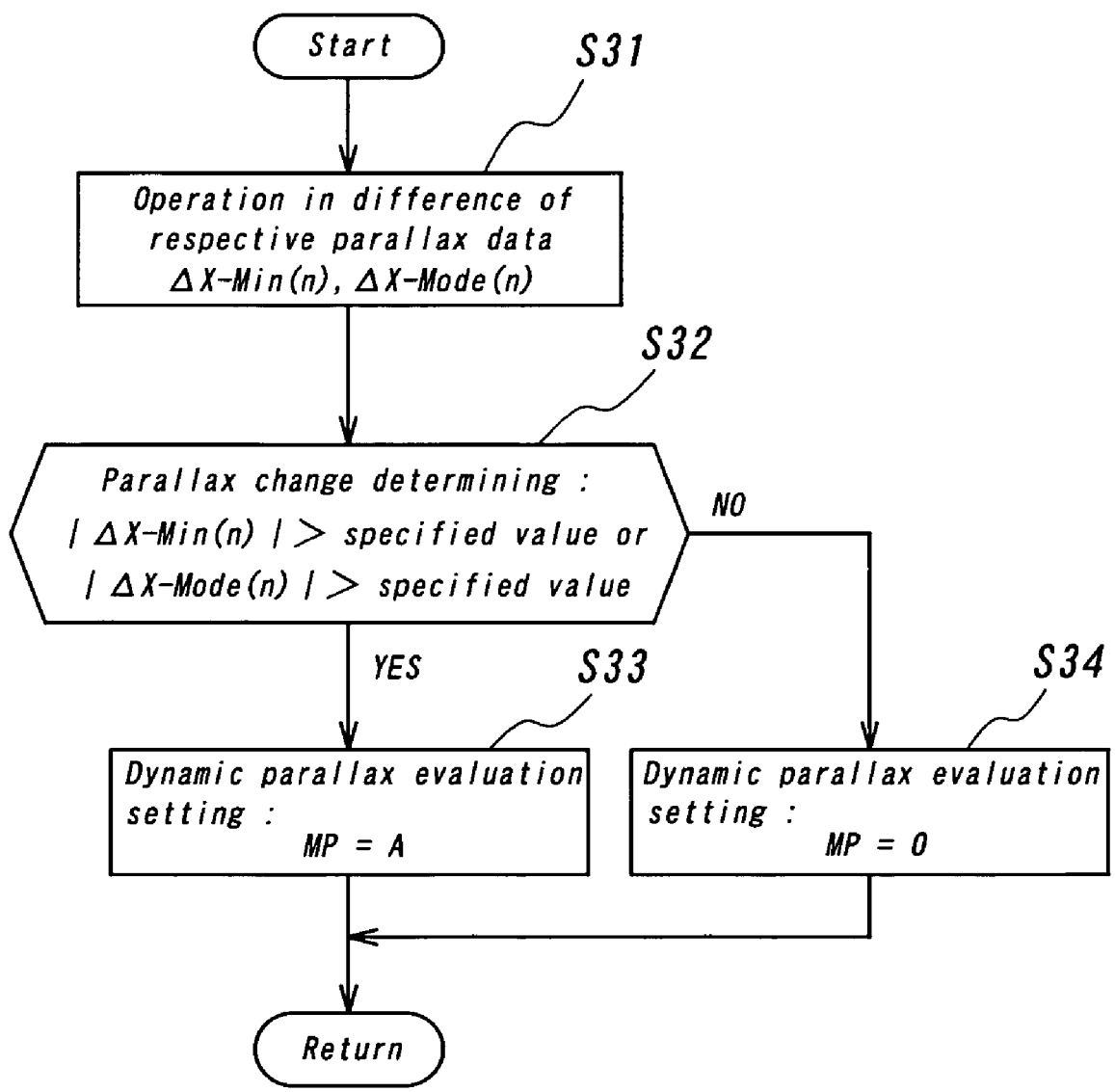
FIG. 9 is a flow chart showing the operation of the dynamic parallax evaluating means shown in FIG. 1.

Next, the operation of the dynamic parallax evaluating means 4-2 is explained by referring to the flow chart shown in FIG. 9. Here, a mode value X-Mode and a minimum value X-Min are used as a parallax statistic. First, in the differential operating means 4-2-1, when differences $\Delta X\text{-Mode}(n)$ and $\Delta X\text{-Min}(n)$ between the n-the parallax statistic and the (n-1)-th parallax statistic, are calculated (step S31), Next, whether or not either of parallax variations $\Delta X\text{-Mode}(n)$ and $\Delta X\text{-Min}(n)$ is more than the specified value in dynamic parallax evaluation value calculation means 4-2-2, is decided (step S32), a fixed value A is substituted for evaluation value MP if either parallax variation is more than the specified value (step S33), and 0 is substituted for evaluation value MP, if either parallax variation is less than the specified value (step S34). Here, the parallax variation corresponds to (the coefficient multiple for) the speed of the parallax change since the measuring interval is constant.

In the method, when the parallax changing speed exceeded the specified value, a constant evaluation value is given, so that the appearance of the parallax change with large speed is counted. Moreover, as a measure of the specified value in the step S32, when the back and forth moving speed becomes two degrees/sec, the visual characteristic that the depth distinction begins to decrease is considered or, when the back and forth moving speed becomes one degree/sec, the visual characteristic that the follow characteristic begins to decrease is considered (refer to Nikkey Electronics, 1998. 4.4, No. 444, p205). Moreover, by considering the angle of view of the image display means 9, in the image display means 9 capable of changing the angle of view, the evaluation value is changed according to the information of the display mode recognizing means 1.

Figure 10:
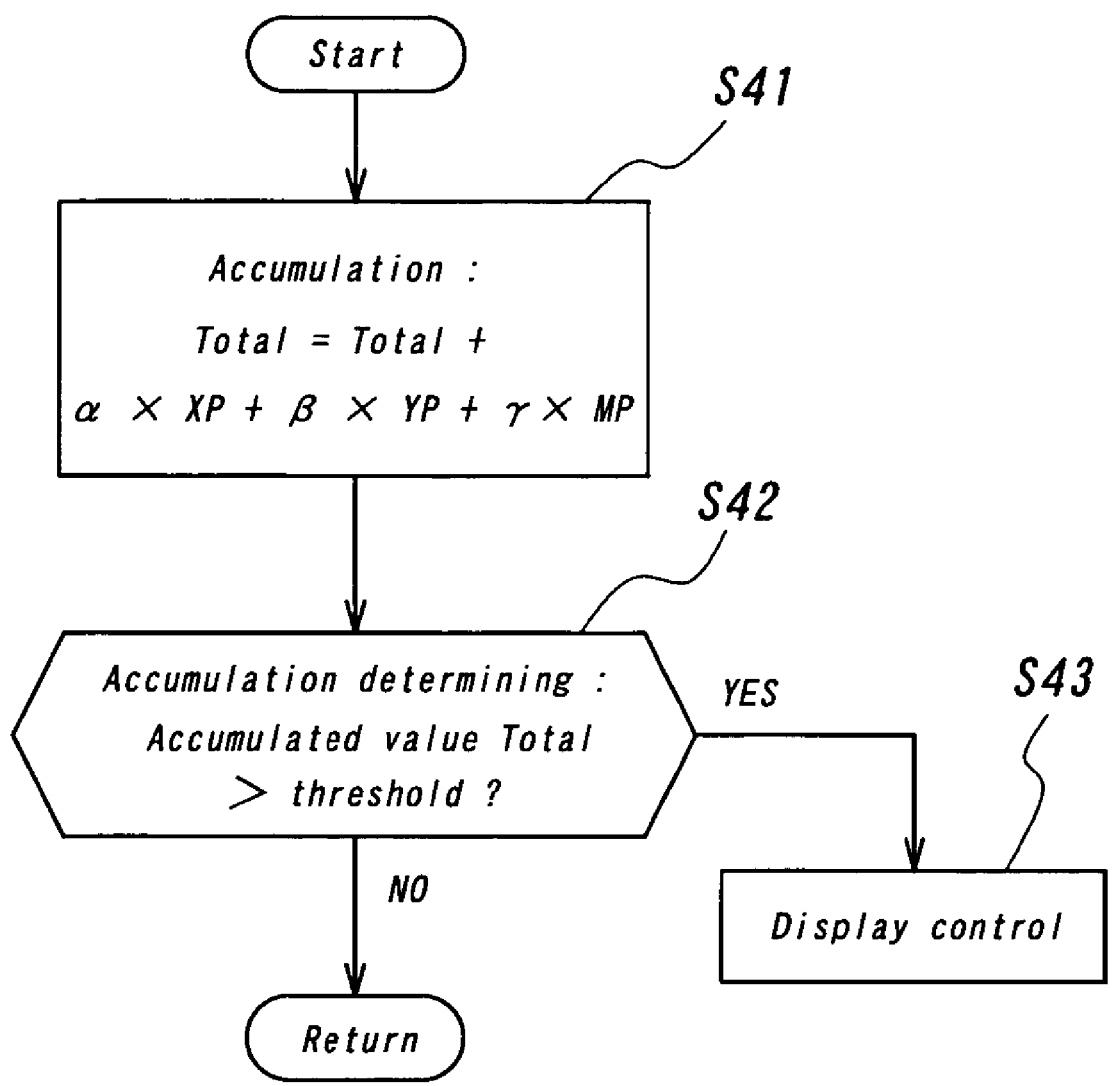
FIG. 10 is a flow chart showing the operation of the evaluation value accumulating means and the accumulated value determining means shown in FIG. 1.

FIG. 10 is a flow chart showing the operation of the evaluation value accumulating means 6 and the accumulated value determining means 7. In the evaluation value accumulating means 6, the horizontal parallax evaluation value XP, the vertical parallax evaluation value YP, and the dynamic parallax evaluation value MP set in the former stage are integrated, and adds to the previously accumulated value Total (step S41). Here, the integration of evaluation values is formed by multiplying and adding the coefficients $\alpha$, $\beta$, and $\gamma$ to respective evaluation values. Moreover, in the accumulated value determining means 7, whether or not the accumulated value Total is larger than the specified value (threshold), is decided (step S42), and if the accumulated value Total is larger than the specified value, the display control for outputting the alarm display signal to the image display means 9 by display control means 8, and for switching to the 2D display, is performed (step S43).

Figure 11:
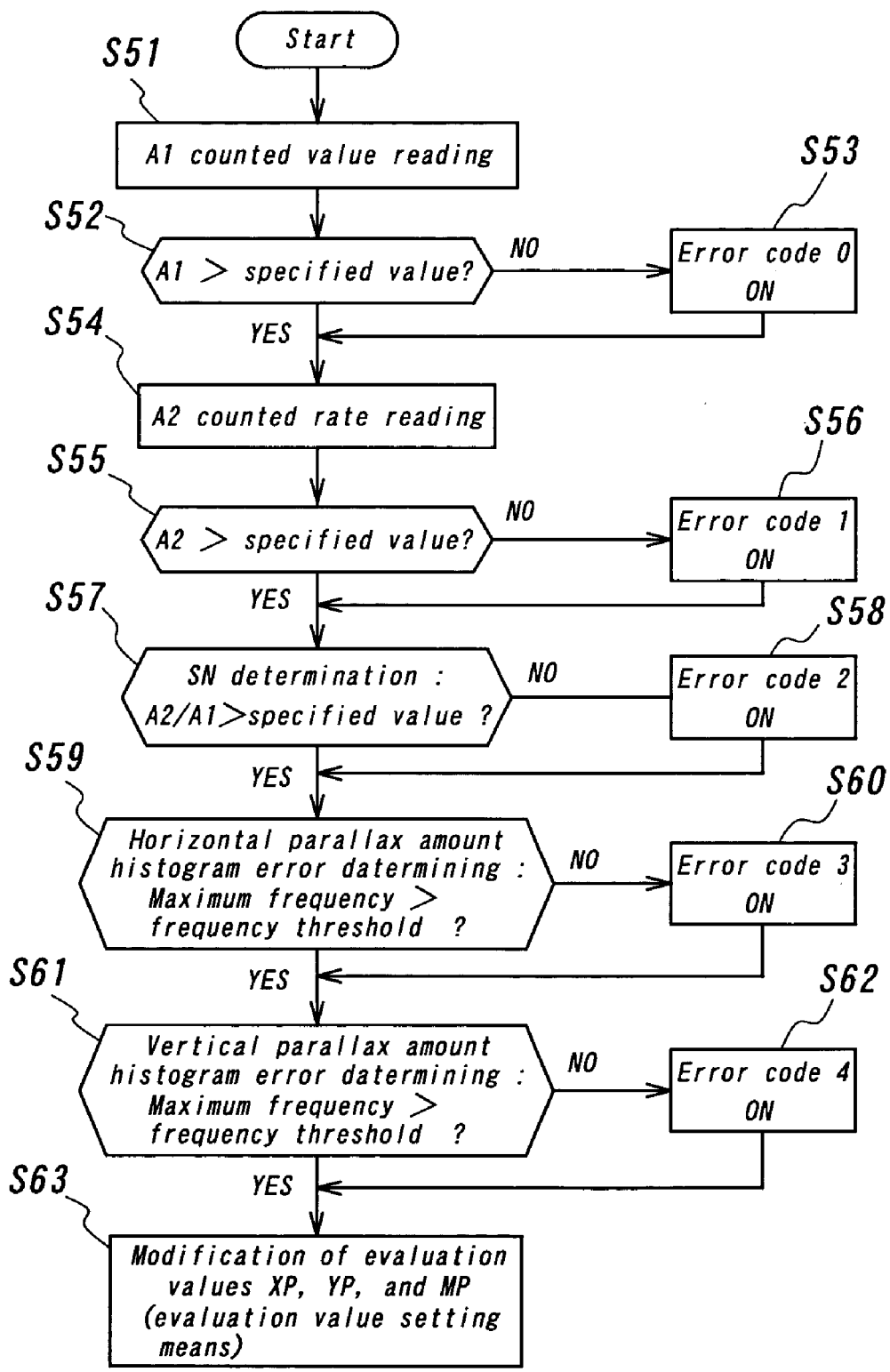
FIG. 11 is a flow chart showing the operation of the error code setting means shown in FIG. 1.

FIG. 11 is a flow chart showing the operation of the error code setting means 5. In the error code setting means 5, the kinds of the errors are classified into an error code 0-an error code 4, an error code corresponding to the case where respective errors occur, is made ON (value=1), and an error code corresponding to the case where respective errors did not occur, is made OFF (value=0).

First, numbers of blocks A1, which was not smoothed, counted by the A1 counter of the parallax measuring means 3 (step S5 in FIG. 4) are read, (step S51), whether or not A1 is more than the specified value, is decided (step S52), and error code 0 is made ON if A1 is less than the specified value (step S51). This corresponds to the case that there is no place to be measured in the changing scene in dark scene or the like, and thus, for example, zero or the frequency threshold of the histogram are given as a specified value.

Next, numbers of blocks A2, which were not smoothed, and did not matching error, counted by the A2 counter of the parallax measuring means 3 (step S7 in FIG. 4) are read (step S54), whether or not A2 is more than the specified value, is decided (step S55), error code 1 is made ON if A2 is less than the specified value (step S56). This corresponds to the case not to be able to calculate the parallax statistic, because of almost all errors, and thus for example, the frequency threshold of 0 and the histogram is given as a specified value.

Next, whether or not S/N ratio is more than the specified value, is decided (step S57). Here, the ratio of A1 and A2 is used as a Signal-Noise ratio, and an error code 2 is made ON as a decision of reliability to be low if the ratio A2/A1 is less than the specified value (step S58). This is decided as that if the matching error is numerous because of the noise or the like, the possibility to miss the detection of the maximum value and minimum value is high, and the reliability of the parallax statistic is low, and thus the specified value is provided according to the precision to be required.

Next, when the parallax statistic of the horizontal parallax and the vertical parallax is calculated by using the histogram, whether or not the frequency of the maximum frequency, that is, the mode value is larger than the frequency threshold, is decided (steps S59, S61), if the maximum frequency of the horizontal parallax amount histogram is less than the frequency threshold, the error code 3 is made ON (step S60), and if the maximum frequency of the vertical parallax amount histogram is less than the frequency threshold, the error code 4 is made ON (step S62). When the data used for the histogram is a little compared with the frequency threshold, this corresponds to the calculation of the abnormal value as the parallax statistic. This corresponds to the calculation of the abnormal value as the parallax statistic that the data used for the histogram is a little compared with the frequency threshold.

In the evaluating means 4, evaluation values XP, YP, and MP are changed referring to these error codes (step S63). Moreover, for the object of the present invention that if there is an image with a strong stimulation, this image is detected and is made not to show for a long time, there is a thought of a method that when the error occurs, all evaluation values are changed to the maximum evaluation value, however, when the evaluation value is uniformly changed in this manner, for example, even if the scene of the changing scene in dark without the image to be seen continues, the maximum evaluation value has been set, this is far apart from substance so that the evaluation value setting is changed according to the kinds of the error.

For example, when the error code 0 is made ON, there is scarcely any portion to be paid attention in the image, so that the calculated evaluation value is substituted by the small constant evaluation value. When the error code 1 and error code 2 are made ON, there is a possibility of failing in detecting the big parallax included in the image so that the evaluation value for the minimum value and the maximum value is replaced by the maximum evaluation value. When the error code 3 and error code 4 are made ON, the evaluation value for the mode value is replaced by the evaluation value for the average value of the maximum evaluation value and the absolute value. Moreover, when any one of the error codes 0-3 is made ON, the parallax change evaluation value is assumed to be insignificant so that the value thereof is assumed to be 0.

In this way, by changing the evaluation value according to the error code set by the error code setting means 5, even if the image, that cannot normally be measured, is included and it is made to fail in detecting the parallax, an appropriate evaluation value can be set.

Second Embodiment

Figure 12:
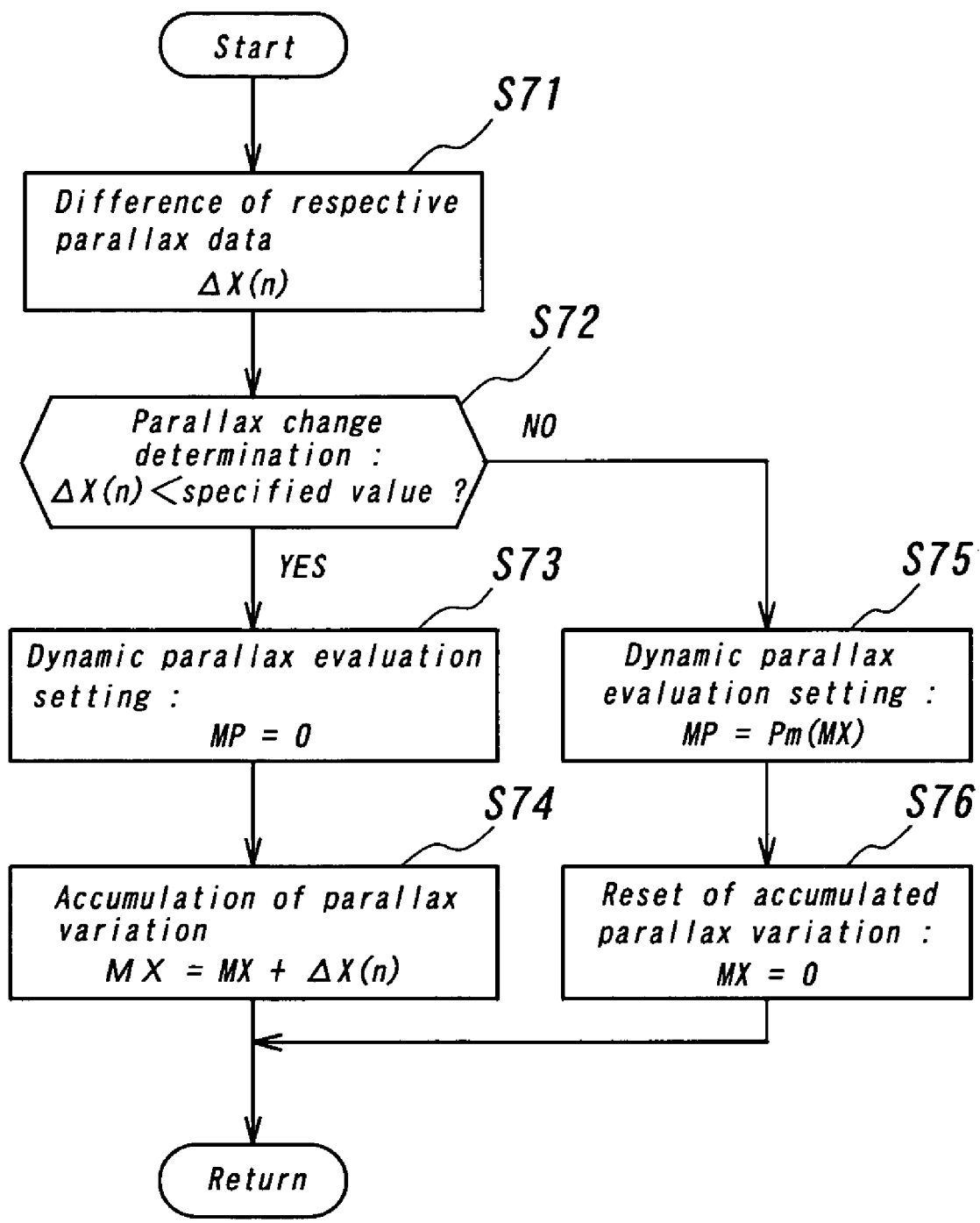
FIG. 12 is a flow chart for explaining the operation of the principal portion in the second embodiment of the display device according to the present invention.

FIG. 12 is a flow chart for explaining the operation of the principal portion in the second embodiment of the display device according to the present invention. In the present embodiment, the dynamic parallax evaluation method in the dynamic parallax evaluating means 4-2 shown in the first embodiment, is different. That is, in the first embodiment, if parallax changes are larger than reference values in every one measuring the evaluation value is set but, the present embodiment pays attention to particularly, the negative parallax change, that is, the change in direction dashing out from screen to viewer and the amount of dashing out thereof.

Therefore, the dynamic parallax evaluation method according to the present embodiment comprises a step S71 of taking the difference $\Delta X(n)$ between n-th parallax statistic and n-1th parallax statistic, a step S72 of deciding whether or not $\Delta X(n)$ is smaller than the specified value, a step S73 of setting the parallax change evaluation value MP to 0, a step S74 of obtaining the accumulated parallax variation MX by accumulating the parallax variation, a step S75 of setting the parallax change evaluation value MP, and a step S76 of resetting the accumulation parallax variation MX.

First, as in the same as the first embodiment, the difference $\Delta X(n)$ between n-th parallax statistic and n-1th parallax statistic is taken, (step S71), but it is decided whether or not $\Delta X(n)$ is smaller than the specified value, different from the case of first embodiment, that is, whether or not the speed is large with the case of a negative direction of the change (step S72). Here, if $\Delta X(n)$ is smaller than the specified value (in the case of YES), parallax change evaluation value MP at this time is made 0 (step S71), and the accumulated parallax variation MX is obtained by accumulating the parallax variation (step S74). On the contrary, if $\Delta X(n)$ is more than the specified value (in the case of NO), the evaluation value MP is set according to the size of accumulated parallax variation MX (step S71), the accumulation parallax variation MX is reset (step S76).

According to the present embodiment, the parallax change is accumulated during the negative parallax change is consecutive, when a series of changes break off, the evaluation value is given according to the accumulated value, so that a greater evaluation value can be set for the motion dashing out from the screen interior forward large, the influence of the scene including the dashing out can be efficiently reflected in the display control.

Third Embodiment

Figure 13:
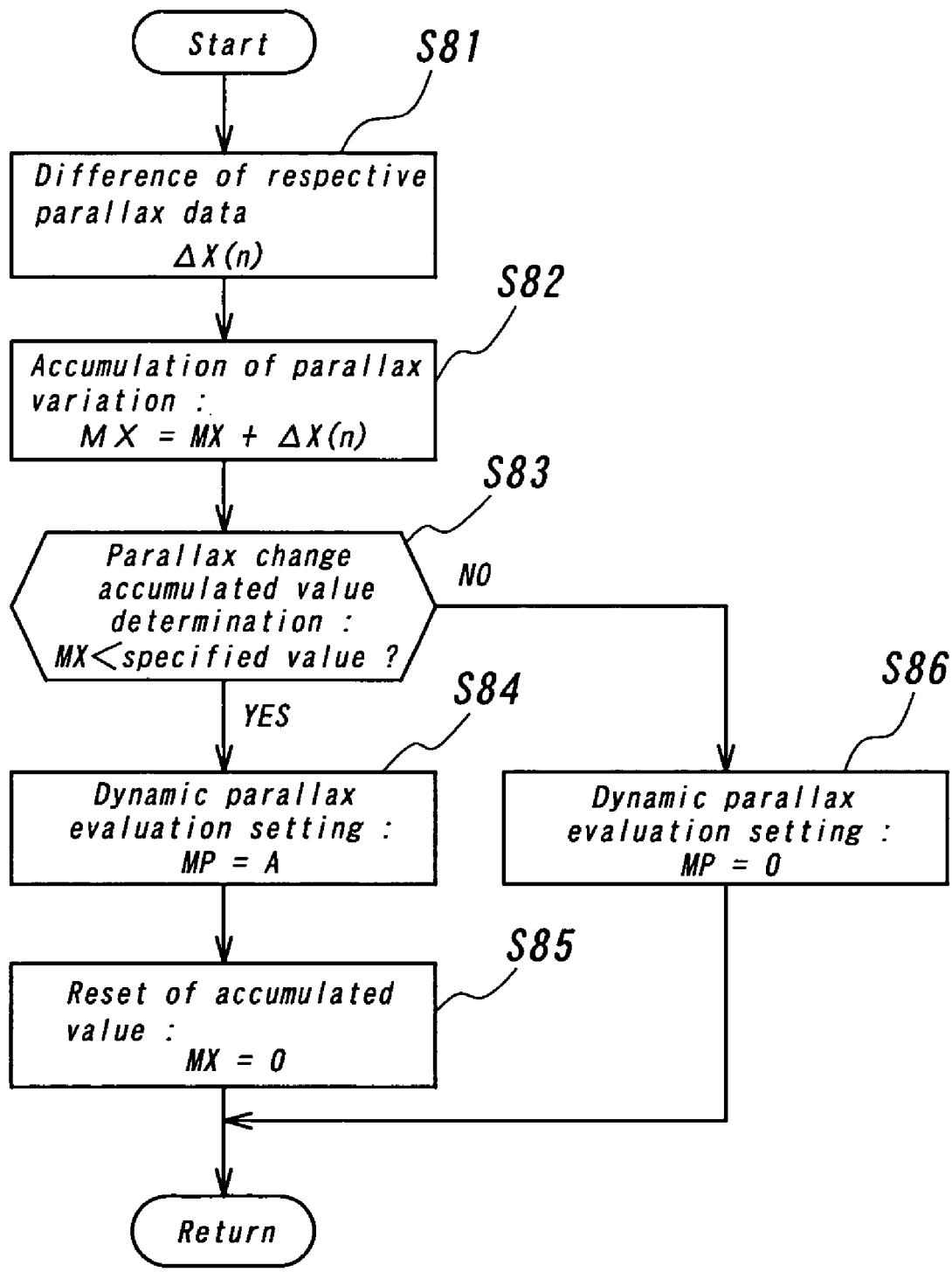
FIG. 13 is a flow chart for explaining the operation of the principal portion in the third embodiment of the display device according to the present invention.

FIG. 13 is a flow chart for explaining the operation of the principal portion in the third embodiment of the display device according to the present invention. Even in the present embodiment, the dynamic parallax evaluation method in the dynamic parallax evaluating means 4-2 shown in the first embodiment, is different, so that the display device according to the present embodiment comprises a step S81 of taking the difference $\Delta X(n)$ between n-th parallax statistic and n-1th parallax statistic, a step S82 of obtaining the accumulated parallax variation MX by accumulating the parallax variation, a step S83 of deciding whether or not the accumulated parallax variation is smaller than the specified value, a step S84 of setting the parallax change evaluation value MP, a step S85 of resetting the accumulation parallax variation MX, and a step S86 of setting the parallax change evaluation value MP to 0.

That is, in the first and second embodiments, the parallax change is decided every measurement, but in this embodiment, the parallax change is determined, and whenever the accumulation parallax variation becomes smaller than the specified value (becomes large in a negative direction), a constant evaluation value is given. In this case, even though the change speed is not necessarily fast, if the parallax change from the screen to this side is continuously generated, the counting is performed. Therefore, if the dashing out forward of the screen in a fast motion is frequently generated, the counting increases according to it, too.

In the first and second embodiments, in the case that the parallax measuring accuracy is made lowered, and the measuring time interval is made shortened, the specified value and the accuracy of measurement for the speed determining make little difference, so that it becomes easy to distinguish neither the noise nor the parallax change, but in the present embodiment, the decision is performed after the parallax changes are accumulated, so that the influence of the noise can be relaxed.

Fourth Embodiment

Figure 14:
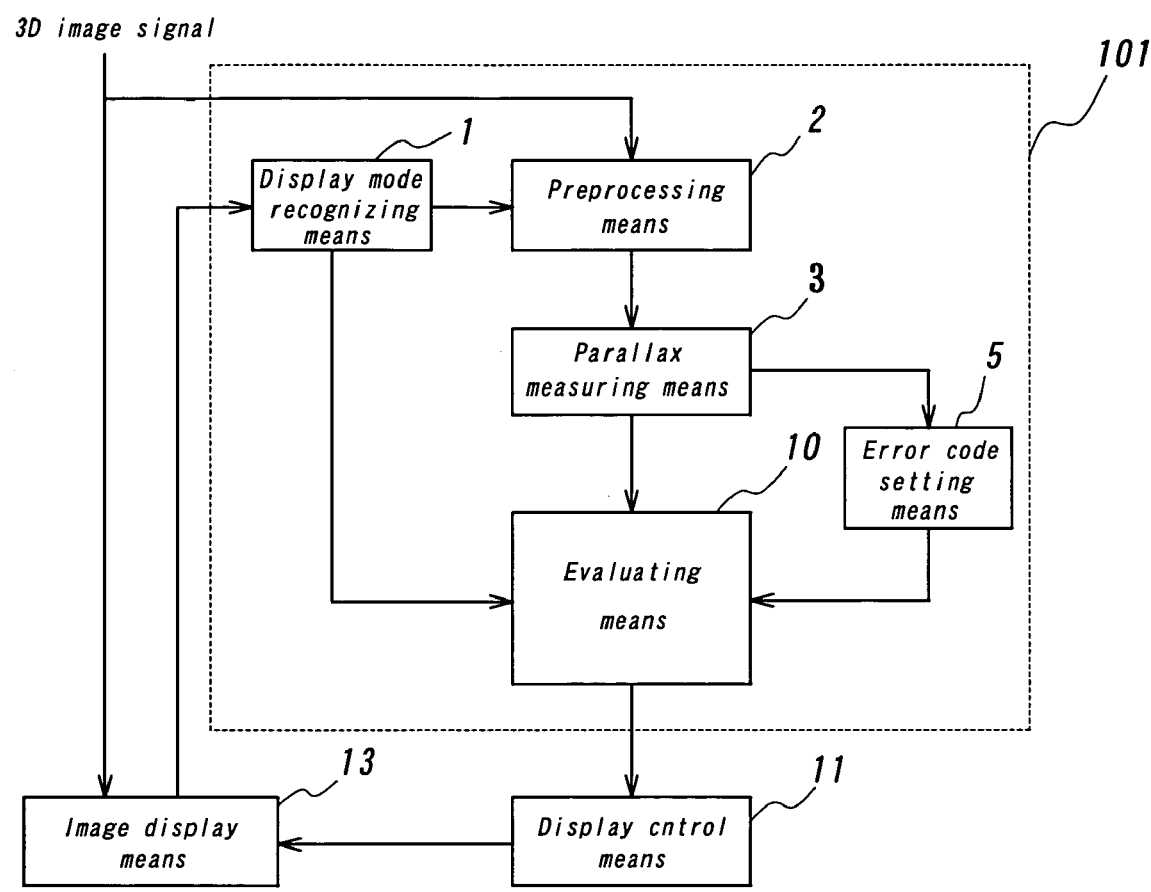
FIG. 14 is a block diagram showing the structure of the fourth embodiment of a display device according to the present invention.

FIG. 14 is a block diagram showing the structure of the fourth embodiment of the display device according to the present invention. The display device comprises a three-dimensional image evaluation device 101, a display control means 11, and an image display means 13, and the three-dimensional image evaluation device 101 comprises a display mode recognizing means 1, a preprocessing means 2, a parallax measuring means 3, an evaluating means 10, and an error code setting means 5. In this embodiment, the same numeral reference is attached to the constructional elements performing the same operation as that of the first embodiment, and the detailed explanation thereof is omitted.

The three-dimensional image signal is inputted to the image display means 13 to display the three-dimensional image. The image display means 13 is an HMD having for example the diopter adjustment function. The three-dimensional image signal is also inputted to the preprocessing means 2, and right and left images are stored in the memory of the preprocessing means 2 respectively here with specific timing, to subject to preprocessing of the resolution conversion and smoothing, etc. The preprocessed image is supplied to the parallax measuring means 3, the parallax amount is measured here to calculate the parallax statistic, and the calculated parallax statistic is supplied to the evaluating means 10. In the evaluating means 10, the parallax statistic is converted into the evaluation value by referring to the conversion table, and the diopter of the image display means 13 is controlled through the display control means 11 based on the evaluation value. Moreover, in the error code setting means 5, the error code in the parallax measuring by the parallax measuring means 3 is recorded, and when the evaluation value is set by the evaluating means 10, the evaluation value is changed if necessary referring to the error code.

Figure 15:
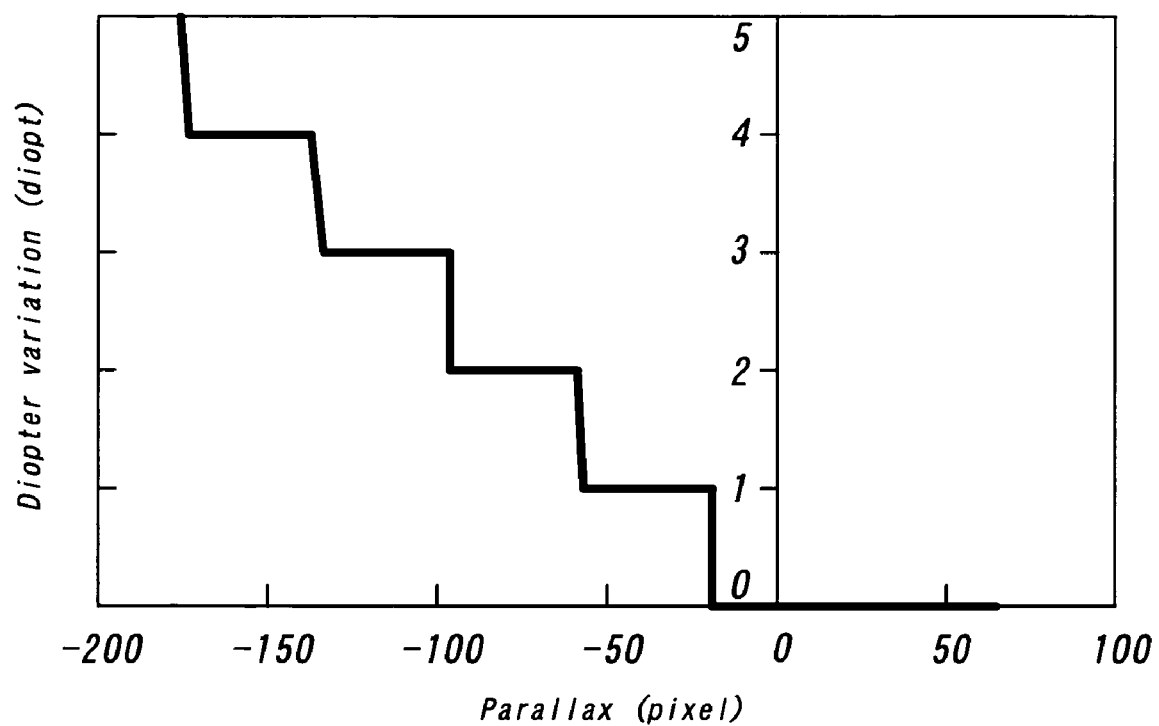
FIG. 15 is a diagram showing the conversion table used in the evaluation means shown in FIG. 14.
Figure 16A:
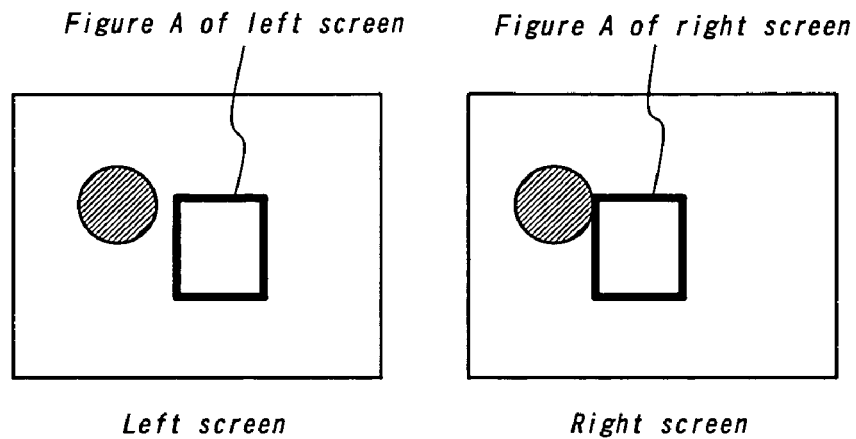
FIGS. 16a and 16b are diagrams explaining the observation principle of three-dimensional image.
Figure 16B:
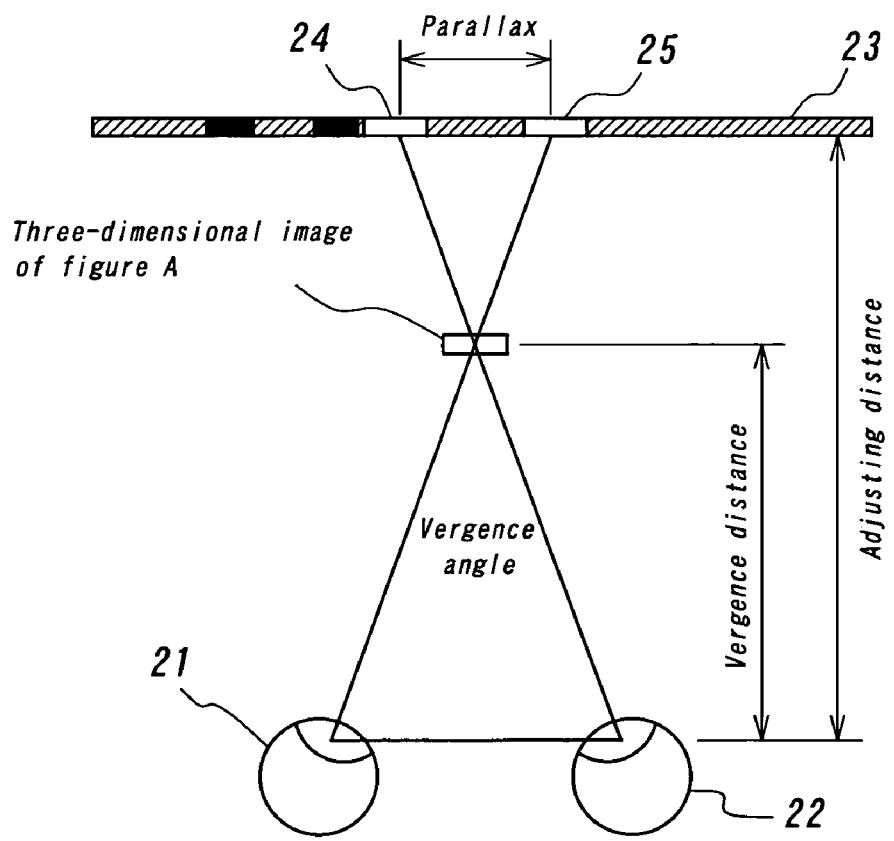

Here, as a conversion table used in the evaluating means 10, for example, the conversion table shown in the graph of FIG. 15 is used. FIG. 15 shows the parallax statistic to the axis of abscissas, and a diopter variation necessary to put the difference between the convergence position and the focus adjusting position of eyes within the small range to axis of ordinates. The mode value and the minimum value are used as a parallax statistic. Moreover, diopter variations necessary for the parallax are different by the spec of the image display means 13, for example, in the case of HMD using the optical system with a deep focal depth, even if the position of the screen does not correspond to convergences of eyes, focus adjusting of eyes can be matched together at a short distance to the convergence, and if the angle of view is different, the viewpoint per one pixel is different as described in the first embodiment. Therefore, the relation between the parallax and the diopter variation is set by taking the tolerance of focal depth and adjusting-convergence disparity of eyes, the spec of the image display means 13, for example, the angle of view, a standard diopter and the focal depth of the optical system or the like, into consideration.

In the embodiment of the graph shown in FIG. 15, the diopter variation is set in such a manner to be allowed until the difference between the adjusting and the vergence distance becomes ±0.5 Dioptar, in the step-wise. Moreover, in the appliance with a viewing distance of 2 m in standard condition, even though the above difference is changed more than 0.5 Dioptar in the plus direction, the viewer can not match the focus, so that the diopter variation is adjusted to 0.

Moreover, as a rule, the modification of the set value by the error code performs an evaluation value to be 0, when the error code is made ON, since when the diopter adjusting is performed by the measurement result with low reliability, the divergence of the diopter and the convergence might rather become large.

By such a constitution, even when the parallax is large, the diopter of image display means 13 (display position of the screen) is changed in such a manner that the difference between the convergence position and the focus adjusting position of eyes is installed within the small range, thereby making the display easy to see, and thus the image with strong visual stimulus can be prevented from being displayed for a long time. Moreover, the appropriate diopter suitable for the image display means 13 can control by using the evaluation value considering the spec of the image display means 13. In addition, abnormal operation can be prevented being caused by changing the evaluation value at generation of the error, even when the image not measured easily is included.

Moreover, the present invention is not limited to only the above embodiments, and thus many variations or modifications can be carried out. For example, the image display means can not limit to HMD, and may also use other two stereoscopic display means. Moreover, in the fourth embodiment, the image display means with the diopter adjusting function was used, but it can be constituted that the convergence is controlled according to the parallax evaluation value by using the image display means capable of adjusting the convergence. In addition, as the parallax statistic, decentralization, a center value, and the average value or the like, can used.

Moreover, various techniques can be utilized as to the matching, for example, when the step in which the matching to respective blocks is repeated by the number of blocks, is realized by the circuit, one circuit may use repeatedly, but there is a method of decreasing the repetition by using a plurality of circuits in parallel, too. Moreover, the setting of the error code and the modification of the evaluation value need not be made strictly as describe here. In addition, if the input mode and the display mode are fixed, the mode recognition means can be omitted, and only a specified image is input, and if the possibility of the error generation is surely small, the error determining can be omitted. Moreover, the display is made delayed, the display of the evaluated image is controlled, and after previously evaluating a series of images and recording the evaluation value, the display may be controlled according to the recorded evaluation value.

POSSIBILITY ON INDUSTRIAL UTILITY

According to the first aspect of the present invention, the parallax statistic is calculated by measuring the parallax included in the input image by a parallax measuring means, and the evaluation value is set by the dynamic parallax evaluating means and/or the static parallax evaluating means of the evaluating means according to the calculated parallax statistic, so that a rapid change in parallax can be calculated, and the counter-measures against the error at the measuring and the noise of the image, can be taken, and thus the parallax information of the image can be suitably evaluated.

According to the second aspect of the present invention, a constant evaluation value is set when the temporal change in parallax statistic exceeds the specified value so that the appearance of the parallax change with large speed is counted, and thus the dynamic evaluation can be performed as to the parallax information on the image.

According to the third aspect of the present invention, the consecutive parallax change is accumulated, and the evaluation value according to the accumulated value is set, when a series of change breaks off, so that the dynamic evaluation emphasizing a big motion as to the parallax information on the image, can be performed.

According to the fourth aspect of the present invention, the parallax variation is accumulated, and a constant evaluation value is set, when the accumulated value exceeds the specified value, so that the parallax measuring accuracy is lowered, even when the interval of the measuring time was shortened, the noise and the parallax change can be distinguished, and the influence of the noise can be relaxed more in the dynamic evaluation of the parallax information on the image.

According to the fifth aspect of the present invention, when the parallax statistic is obtained, the parallax value is disregarded if the frequency of appearance is below the threshold, so that the reliability of the parallax statistic can be improved.

According to the sixth aspect of the present invention, the kind of the displayed image is recognized by the image recognition means, and the picture processing is performed to the input image by the preprocessing means according to the recognized result, so that the same processing and the same circuit can be used regardless of the kind of the input image.

According to the seventh aspect of the present invention, an error code can be set by detecting the situation with low reliability of the parallax measuring by the error code setting means, and the evaluation value can be changed according to the set error code, so that an appropriate evaluation value can be set even with low reliability of the measuring.

According to the eighth aspect of the present invention, the evaluation value is set according to the display mode in the image display means, so that even if the display mode is changed, the evaluation value can be appropriately set.

According to the ninth aspect of the present invention, the display of the input image by the image display means is controlled by the image display means based on the evaluation value set by the three-dimensional image evaluation device, so that viewing of the image for a long time with a large degree of influence can be avoided surely.

What is claimed is:

1. A three-dimensional image evaluation device for evaluating an input image that comprises information of a right side image and a left side image for constructing a three-dimensional image, said three-dimensional image evaluation device comprising:
    parallax measuring means for measuring parallax included in the input image and calculating values of parallax statistics of the measured parallax; and
    evaluating means for setting an evaluation value according to the calculated values of the parallax statistics,
    wherein the evaluating means comprises at least one of static parallax evaluating means for setting an evaluation value based on the values of the parallax statistics and a dynamic parallax evaluating means for setting an evaluation value based on a temporal change in the values of the parallax statistics.

2. A three-dimensional image evaluation device as claimed in claim 1, wherein the dynamic parallax evaluating means sets a constant value as the evaluation value when the temporal change exceeds a specified value.

3. A three-dimensional image evaluation device as claimed in claim 1, wherein the dynamic parallax evaluating means accumulates the parallax change while the parallax change is consecutive, and the dynamic parallax evaluating means sets the evaluation value according to the accumulated value, when a series of change breaks off.

4. A three-dimensional image evaluation device as claimed in claim 1, wherein the dynamic parallax evaluating means accumulates the parallax change, and a constant evaluation value is set when the accumulated value exceeds a default.

5. A three-dimensional image evaluation device as claimed in claim 1, wherein the parallax measuring means makes a histogram by measuring the parallax included in the input image, and calculates the values of the parallax statistics based on parallax values appearing in the histogram with a frequency exceeding a threshold.

6. A three-dimensional image evaluation device as claimed in any one of claims 1-5, further comprising:
    image recognition means for recognizing a kind of an image displayed by an image display means; and
    preprocessing means for performing picture processing to the input image according to the recognized kind of the image,
    wherein the image processed by the preprocessing means is supplied to the parallax measuring means.

7. A three-dimensional image evaluation device as claimed in any one of claims 1-5, further comprising error code setting means for setting an error code based on the parallax measurement by the parallax measuring means, wherein the evaluating means changes the evaluation value according to the set error code.

8. A three-dimensional image evaluation device as claimed in any one of claims 1-5, further comprising display mode recognizing means for recognizing a display mode of an image in an image display means, wherein the evaluating means sets the evaluation value according to the recognized display mode.

9. A display device comprising:
    image display means for displaying the input image,
    the three-dimensional image evaluation device as claimed in any one of claims 1-5, for evaluating the input image, and
    display control means for controlling the display of the input image by the image display means based on the evaluation value set by the three-dimensional image evaluation device.

10. A three-dimensional image evaluation device for evaluating an input image that comprises information of a right side image and a left side image for constructing a three-dimensional image, said three-dimensional image evaluation device comprising:
    parallax measuring means for measuring parallax included in the input image and calculating values of parallax statistics of the measured parallax; and
    evaluating means for setting an evaluation value according to the calculated values of the parallax statistics,
    wherein the evaluating means comprises at least one of static parallax evaluating means for setting an evaluation value based on the values of the parallax statistics and dynamic parallax evaluating means for setting an evaluation value based on a temporal change in the values of the parallax statistics,
    wherein the parallax measuring means measures the parallax by dividing the input image into a plurality of blocks, measuring a parallax amount of each of the blocks, and excluding a parallax amount obtained from at least one blocks for which it is determined that the parallax amount could not be measured, and wherein the parallax measuring means calculates the values of the parallax statistics by making a histogram of the measured parallax amounts, and disregarding data of the parallax amounts appearing in the histogram with a frequency that is lower than a predetermined threshold.

* * * * *